United States Patent Office 2,794,842
Patented June 4, 1957

2,794,842

CATALYTIC POLYMERIZATION OF OLEFINS

John Paul Hogan and Robert Louis Banks, Bartlesville, Okla., assignors to Phillips Petroleum Company, a corporation of Delaware No Drawing. Application April 13, 1953,
Serial No. 348,586

12 Claims. (Cl. 260—683.15)

This invention relates to the catalytic polymerization of olefins in the presence of nickel sulfate-promoted catalysts. A specific aspect of this invention pertains to the manufacture and activation of nickel sulfate-promoted catalysts and to the resulting catalysts themselves.

The conversion of olefins to hydrocarbons of higher molecular weight by polymerization reactions is well known. In some instances, such polymerization may be accomplished solely by the application of heat and pressure, but in many cases the use of a catalyst is desirable since the presence of a catalyst usually causes the polymerization to proceed at a lower temperature, decreases the types of polymeric material formed, and increases the yield of desired products. A large number of elements or combination of elements or compounds has been found useful for the polymerization of unsaturated compounds, particularly metal oxides such as nickel, copper, iron, and cobalt, either alone or in various combinations.

It has been established that no catalyst is the exact equivalent of any other catalyst and that products differing not only in molecular weight, but also in molecular structure, may be prepared through the use of different catalysts when polymerizing the same olefins. We have now found that nickel sulfate supported on silica, alumina, or silica-alumina and activated at an elevated temperature in the presence of air, or other oxygen-containing gas, produces a catalyst by which an advantageous conversion of unsaturated hydrocarbons to polymeric material may be effected. We have further found that a nickel oxide-promoted silica-alumina catalyst, which has become unsuitable for further use as a hydrocarbon conversion catalyst because of the accumulation of sulfur compounds from the hydrocarbon material being treated and the formation of nickel sulfide by the reaction of said sulfur compounds with said nickel oxide, may be converted into an improved catalyst for the polymerization and unsaturated hydrocarbons by treatment of the poisoned catalyst at elevated temperatures and in the presence of oxygen or oxygen-containing gases to convert the nickel sulfide into a more active catalyst containing nickel sulfate.

This invention is concerned with a process for the polymerization of olefinic hydrocarbons to form a polymeric material, which comprises contacting the olefinic feed material with a nickel sulfate-promoted silica, alumina, or silica-alumina catalyst composed of 50 to 95 weight percent silica, 5 to 50 weight percent alumina, and 0.1 to 10 weight percent elemental nickel, based on the weight of the supporting material, at a temperature in the range of 50 to 300° F., a pressure from atmospheric to 2000 p. s. i. or above, and a space velocity up to 20 LHSV.

As the support for our catalyst, it is preferred to use a mixture of silica and alumina in some combination of from 50 to 95 percent by weight of silica and 5 to 50 percent by weight of alumina, based on the weight of the support. A particularly effective support is a composition of 90 weight percent silica and 10 weight percent alumina. Other catalyst supports may also be used, such as silica or alumina separately, kieselguhr, or the like; however, the results obtained with nickel sulfate on these supports is less satisfactory than with the silica-alumina support. The percentage of nickel sulfate in the finished catalyst may vary widely. Ordinarily, it ranges upwardly from one-tenth of a percent to 10 percent by weight or even higher, based on the weight of the support and calculated as elemental nickel. More commonly, the nickel sulfate content will range from about 2 percent to 6 percent by weight calculated as elemental nickel, and preferably about 4 percent by weight. Concentrations of nickel in the range of 2 to 6 weight percent of the support give a highly active catalyst and the resulting catalyst is much less expensive than when higher concentrations of nickel are employed.

The catalysts of our invention may be prepared by a wide variety of chemical routes. The essential features of the invention are to firmly fix nickel sulfate on the support and to activate the nickel sulfate by heating it at elevated temperatures in an oxygen-containing atmosphere. A preferred method of preparing the catalyst is to impregnate a suitable support material with a solution of nickel sulfate of sufficient concentration to obtain the desired concentration of nickel sulfate on the support; however, a nickel-containing catalyst may be treated with a sulfur compound and the nickel sulfate formed by subsequent treatment so as to produce a highly active nickel sulfate catalyst. For example, treatment of a nickel-containing catalyst already on a suitable support material, with a sulfiding agent forms nickel sulfide which may be oxidized to nickel sulfate by heating in an oxygen-containing atmosphere at high temperatures. Some effective sulfiding agents are hydrogen sulfide, alkyl mercaptans, and disulfides. A nickel oxide-promoted silica-alumina catalyst which has been poisoned in polymerization or other hydrocarbon conversion processes by sulfur-containing raw materials may also be used in the practice of my invention. In this case, the material may already have sufficient sulfur content so that additional treatment with a sulfiding agent will not be necessary in order to make a very satisfactory nickel sulfate catalyst by simply converting the nickel sulfide to nickel sulfate. The oxidation of nickel sulfide may be performed by any of the processes of the prior art and we prefer heating the sulfur-containing nickel oxide-promoted silica-alumina catalyst in an atmosphere of air at a temperature in the range of 800 to 1100° F., particularly, 900 to 950° F. The nickel sulfide may be converted to nickel sulfate by heating in other atmospheres besides air as, for instance, in a dilute mixture of oxygen in an inert gas such as nitrogen. The activation period may be shortened some by utilizing higher concentrations of oxygen than found in air.

After the nickel sulfate has been fixed or deposited on the supporting material, the catalyst must be activated. If the nickel sulfate has been prepared by oxidation of nickel sulfide wherein an elevated temperature of from 850 to 1100° F. has been encountered, further activation usually is not necessary. In a method of preparation in which the nickel sulfate is prepared by some procedure not requiring the application of heat in an oxygen-containing atmosphere, such as by impregnation of a support material with a solution of nickel sulfate, an activation step is required. Suitable activation is obtained by heating the catalyst complex in an oxygen-containing atmosphere at a temperature in the range of 800 to 1100° F., and preferably in the range of 900 to 950° F., which are the same conditions used in oxidation of the nickel sulfide to produce an active nickel sulfate catalyst. The period of activation required is at least 2 hours and preferably 3 hours or longer. Activation periods as long as 100 hours have been used to effect activation of the catalyst apparently without deleterious effect on the catalyst, but, after three or four hours of activation at optimum temperatures in an oxygen-containing ambient little, if any, improvement in the catalyst is obtained.

Polymerization reactions utilizing our catalyst may be performed with a wide variety of polymerizable olefinic compounds to be found in either refinery gases or elsewhere. For example, ethylene, propylene, normal butylenes, isobutylene, the isomeric pentenes, and similar higher monoolefinic hydrocarbons of either a straight chain or branched chain character may be employed. The polymerization temperature may vary within a rather wide range but, in general, will not be much lower than about 50° F. nor appreciably above about 300° F. and we prefer to operate in the range of about 100 to 200° F. The liquid hourly space velocity may be as high as about 20 and we prefer up to about 10. High pressures favor the polymerization reaction, but under suitable conditions the reaction may be carried out under a wide range of pressure from as low as atmospheric, or below, to as high as 2000 p. s. i. or above. High pressures not only increase the rate of polymerization, but also increase the average molecular weight of the polymer formed. Although the polymerization reaction may be carried out in either liquid or gaseous phase, we prefer to use liquid phase operations and, therefore, use a pressure which insures substantial or complete liquid phase operation. Liquid phase operation facilities control of the reaction temperature and contributes to catalyst life by diminishing the deposition of high molecular weight, or other nonvolatile or insoluble materials, in the catalyst surface.

*Example I*

A polymerization catalyst was prepared by impregnating a silica-alumina support material of 90 weight percent silica and 10 weight percent alumina with a sufficient amount of 27 percent aqueous nickel sulfate hexahydrate solution to form a catalyst containing 4 weight percent elemental nickel, based on the weight of the supporting material. After removal of the excess liquid by filtration, the catalyst was dried and then activated by heating in air at a temperature of 900° F. No sulfur trioxide fumes could be detected during the activation process, indicating that the nickel sulfate was not decomposed. This nickel sulfate-promoted silica-alumina catalyst was compared to a conventional nickel oxide-promoted silica-alumina catalyst of the same nickel content in polymerization reactions at a temperature of 160° F., a pressure of 600 p. s. i. g., and 2 liquid hourly space velocity. The feed material contained 20 to 25 percent propylene and the average conversion of polymeric material after a six hour run was 92 percent for the nickel sulfate-supported catalyst and 86 percent conversion for the nickel oxide-supported catalyst.

*Example II*

As another example, a nickel oxide-promoted silica-alumina polymerization catalyst which had been poisoned with a feed material containing mercaptan was regenerated by heating for a period of 4 to 5 hours at 930° F. in an atmosphere of air and compared to a new nickel oxide-promoted silica-alumina catalyst of the same composition as the original catalyst. In the polymerization of a feed material containing 20 to 25 percent propylene at 160° F. temperature, 600 p. s. i. g. pressure, and 2 liquid hourly space velocity, the conversions of polymeric material were found to be 88 percent for the catalyst prepared according to our invention and 86 percent for the new nickel oxide-promoted silica-alumina catalyst.

It will be appreciated by those skilled in the art that the foregoing examples merely illustrate the invention and that the same should not serve to unnecessarily limit or restrict the invention. Various modifications of the disclosed invention may be practiced without departing from the spirit and scope of the same.

We claim:

1. A process for polymerizing an olefinic hydrocarbon which comprises contacting said hydrocarbon under polymerizing conditions with a catalyst consisting essentially of nickel sulfate in minor but polymerizing amount and at least one member of the group consisting of silica and alumina in a major amount so as to form polymeric hydrocarbon.

2. The process of claim 1 in which the nickel sulfate is deposited on a silica-alumina support.

3. The process of claim 1 in which nickel sulfate is deposited on silica.

4. The process of claim 1 in which nickel sulfate is deposited on alumina.

5. The process of claim 1 in which the catalyst consists of a silica-alumina support containing from 50 to 95 weight percent silica and from 5 to 50 weight percent alumina having deposited thereon from 0.1 to 10 weight percent of nickel sulfate calculated as elemental nickel based on the weight of the support.

6. The process of claim 1 in which the olefinic hydrocarbon is ethylene.

7. The process of claim 1 in which the olefinic hydrocarbon is propylene.

8. The process of claim 1 in which the olefinic hydrocarbon is n-butene.

9. The process of claim 1 in which the olefinic hydrocarbon is isobutylene.

10. The process of claim 1 in which the olefinic hydrocarbon is a pentene.

11. The process of claim 1 in which the hydrocarbon is a monoolefin.

12. A process for polymerizing a polymerizable olefinic hydrocarbon which comprises contacting a hydrocarbon of said class with a catalyst consisting essentially of nickel sulfate in minor but polymerizing amount deposited on a support of the group consisting of silica, alumina, and silica-alumina in a major amount, at a temperature in the range of 50 to 300° F., at a pressure in the range of atmospheric to 2000 p. s. i. and at a liquid hourly space velocity in the range of 0.5 to 20 so as to produce polymeric hydrocarbons.

References Cited in the file of this patent

UNITED STATES PATENTS

| | | |
|---|---|---|
| 2,224,071 | Wasserman | Dec. 3, 1940 |
| 2,560,433 | Gilbert et al. | July 10, 1951 |
| 2,581,228 | Bailey et al. | Jan. 1, 1952 |
| 2,589,189 | Ciapetta et al. | Mar. 11, 1952 |
| 2,732,329 | Doumani | Jan. 24, 1956 |

FOREIGN PATENTS

| | | |
|---|---|---|
| 643,862 | Great Britain | Sept. 27, 1950 |